United States Patent
Yeung et al.

(10) Patent No.: US 6,750,920 B1
(45) Date of Patent: Jun. 15, 2004

(54) METHOD AND APPARATUS FOR ADJUSTING BIAS AND AMPLITUDE OF A VIDEO SIGNAL

(75) Inventors: Sally Yeung, North York; Hugh Chow, Richmond Hill, both of (CA)

(73) Assignee: ATI International Srl (BB)

( * ) Notice: Subject to any disclaimer, the term of this patent is extended or adjusted under 35 U.S.C. 154(b) by 0 days.

(21) Appl. No.: 09/268,475

(22) Filed: Mar. 16, 1999

(51) Int. Cl.[7] .............................. H04N 5/20; H04N 5/16
(52) U.S. Cl. ..................... 348/677; 348/691; 348/673; 348/678; 348/572; 348/255
(58) Field of Search ................. 348/691, 692, 348/673, 677, 678, 689, 573, 572, 554, 555, 707, 710, 255, 257; 327/103, 307, 306, 101; 341/139, 155; 330/136, 135; H04N 5/20, 5/16

(56) References Cited

U.S. PATENT DOCUMENTS

| | | | | |
|---|---|---|---|---|
| 3,558,816 A | * | 1/1971 | Wise | 178/7.2 |
| 4,376,288 A | * | 3/1983 | Shanley, II et al. | 348/673 |
| 4,525,741 A | * | 6/1985 | Chahal et al. | 348/255 |
| 5,349,390 A | * | 9/1994 | Stessen et al. | 348/679 |
| 5,486,869 A | * | 1/1996 | Cooper | 348/525 |
| 5,528,035 A | * | 6/1996 | Masarik et al. | 250/338.3 |
| 5,546,050 A | * | 8/1996 | Florian et al. | 330/282 |
| 5,557,220 A | * | 9/1996 | Araya et al. | 327/28 |
| 5,748,263 A | * | 5/1998 | Ball | 348/734 |
| 5,754,250 A | * | 5/1998 | Cooper | 348/525 |
| 5,815,012 A | * | 9/1998 | Rivoir et al. | 327/103 |

\* cited by examiner

Primary Examiner—John W. Miller
Assistant Examiner—Jean W. Désir
(74) Attorney, Agent, or Firm—Vedder, Price, Kaufman & kammholz

(57) ABSTRACT

A method and apparatus for adjusting the amplitude and DC bias of a video signal is presented, which may be performed in preparation for analog-to-digital conversion. This is accomplished by first converting a received voltage mode video signal to a current mode video signal. Similarly, a voltage mode bias control signal is converted to a current mode bias control signal. The amplitude of the current mode video signal is then adjusted to produce an amplitude adjusted video signal. Similarly, the amplitude of the current mode bias signal is adjusted to produce an amplitude adjusted bias control signal. The current mode amplitude adjusted signals are then combined to produce a biased adjusted current mode video signal. The biased adjusted current mode video signal is then converted back to a voltage mode signal, which may be provided to an analog-to-digital converter for conversion.

19 Claims, 3 Drawing Sheets

METHOD AND APPARATUS FOR ADJUSTING BIAS AND AMPLITUDE OF A VIDEO SIGNAL

FIELD OF THE INVENTION

The invention relates generally to video graphics processing and more particularly to a method and apparatus for adjusting bias and amplitude of a video signal.

BACKGROUND OF THE INVENTION

Video signals originate from a variety of sources including TV tuners, digital video disc (DVD) players, video cassette recorders (VCRs), video cameras, and the like. In many situations, the video signals are in an analog format. In order to allow these analog video signals to be processed using digital processors to create special effects, merge signals, or perform other digital signal processing, the analog signals must be converted to a digital format.

In many cases, the analog-to-digital (A/D) converters used to perform the conversion of these video signals have stringent input requirements. In order to allow for conversion, the video signals may have to be adjusted such that input requirements of the A/D converters are met. The conditioning required to place these video signals within the specifications of the A/D converters may include adjusting the amplitude and the DC bias of the signals.

In many cases, the amplifiers utilized to adjust the amplitude of the video signals are limited by the power supplies of the amplification circuit. This can cause portions of the signal to be clipped, or truncated. This clipping or truncation can result in a degraded video signal that is undesirable in many applications.

Another problem that often arises in preparing the video signal for A/D conversion is the susceptibility of the signal to noise within the circuit. This is especially true in integrated circuit implementations that include a large amount of digital circuitry. The switching of a large amount of digital gates in close time proximity can cause spikes on the power supplies of such integrated circuits, thus injecting noise into the video signal. This noise can result in a degraded video signal.

Video signals from various sources can expect different termination resistance values. For example, the output of a DVD player may incorporate some level of termination resistance that differs from that of a VCR. As such, the termination resistance provided on the circuit that performs the A/D conversion may have differing effects on received video signals. Some video signals may be greatly attenuated, whereas others may have more amplitude than is desired. The ability to adjust the amplitude of such signals prior to conversion is important, and as stated earlier, should be accomplished without inducing truncation or clipping of the signals.

Therefore, a need exists for a method and apparatus for preparing video signals for analog-to-digital conversion that reduces susceptibility of the video signals to noise and allows for amplitude adjustment of the video signal without the truncation that can occur due to power supply limitations.

DETAILED DESCRIPTION OF A PREFERRED EMBODIMENT OF THE INVENTION

Generally, the present invention provides a method and apparatus for adjusting the amplitude and DC bias of a video signal, which may be performed in preparation for analog-to-digital conversion. This is accomplished by first converting a received voltage mode video signal to a current mode video signal. Similarly, a voltage mode bias control signal is converted to a current mode bias control signal. The amplitude of the current mode video signal is then adjusted to produce an amplitude adjusted video signal. Similarly, the amplitude of the current mode bias signal is adjusted to produce an amplitude adjusted bias control signal. The current mode amplitude adjusted signals are then combined to produce a biased adjusted current mode video signal. The biased adjusted current mode video signal is then converted back to a voltage mode signal, which may be provided to an analog-to-digital converter for conversion.

By converting the video signal from a voltage mode format to a current mode format, the susceptibility of the signal to noise is reduced. In addition to this, linear gain is easier to achieve in an amplifier when a current mode signal is adjusted. The current mode signal is not "penned in" by the power supply rails as a voltage mode signal would be. Thus, the amplitude of the signal can be adjusted without experiencing the truncation that can occur when the amplitude of a voltage node signal exceeds the limitations of the amplifier's power supply.

Figure 1:
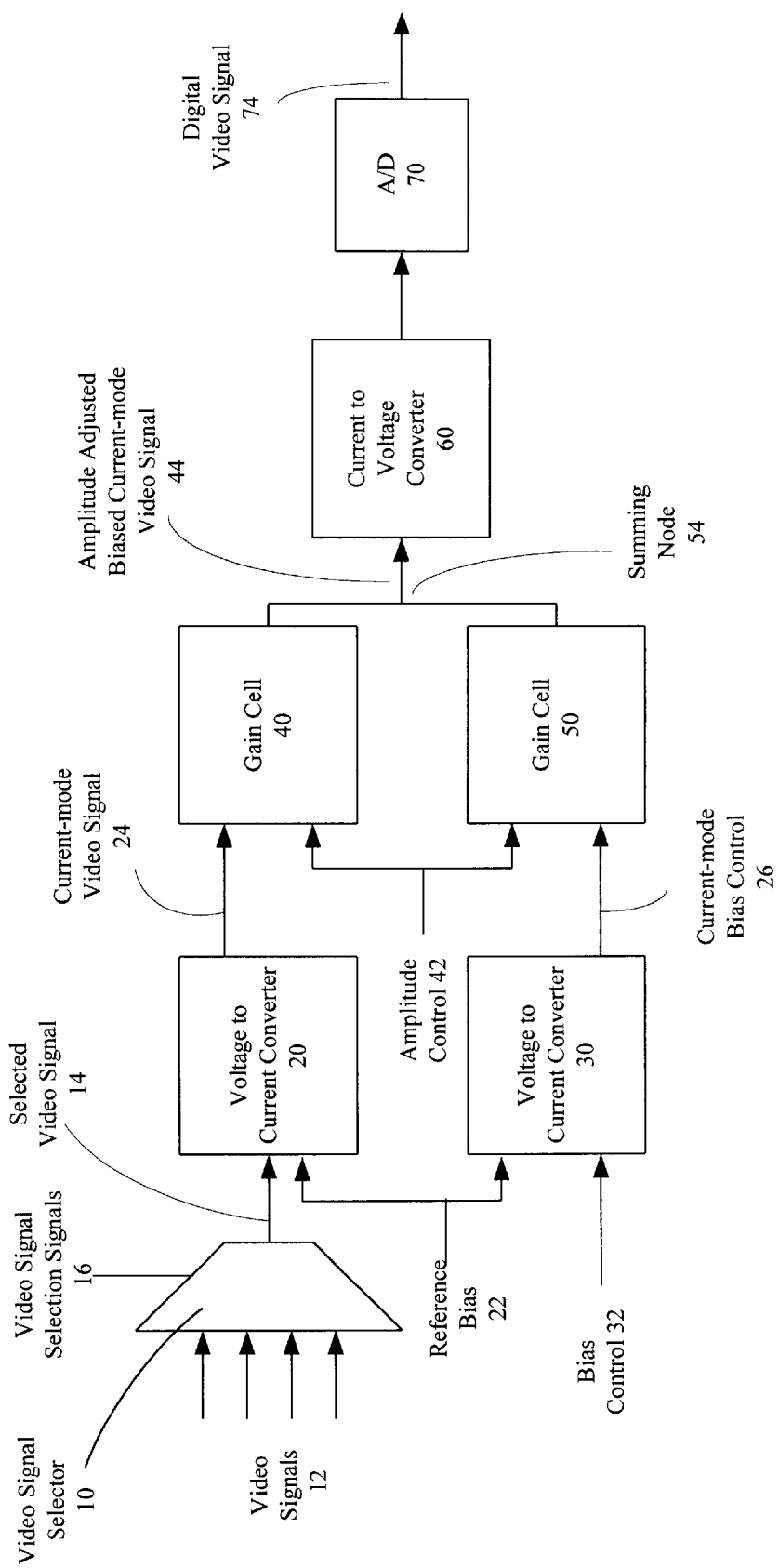
FIG. 1 illustrates a block diagram of a video signal adjusting circuit in accordance with the present invention.
Figure 2:
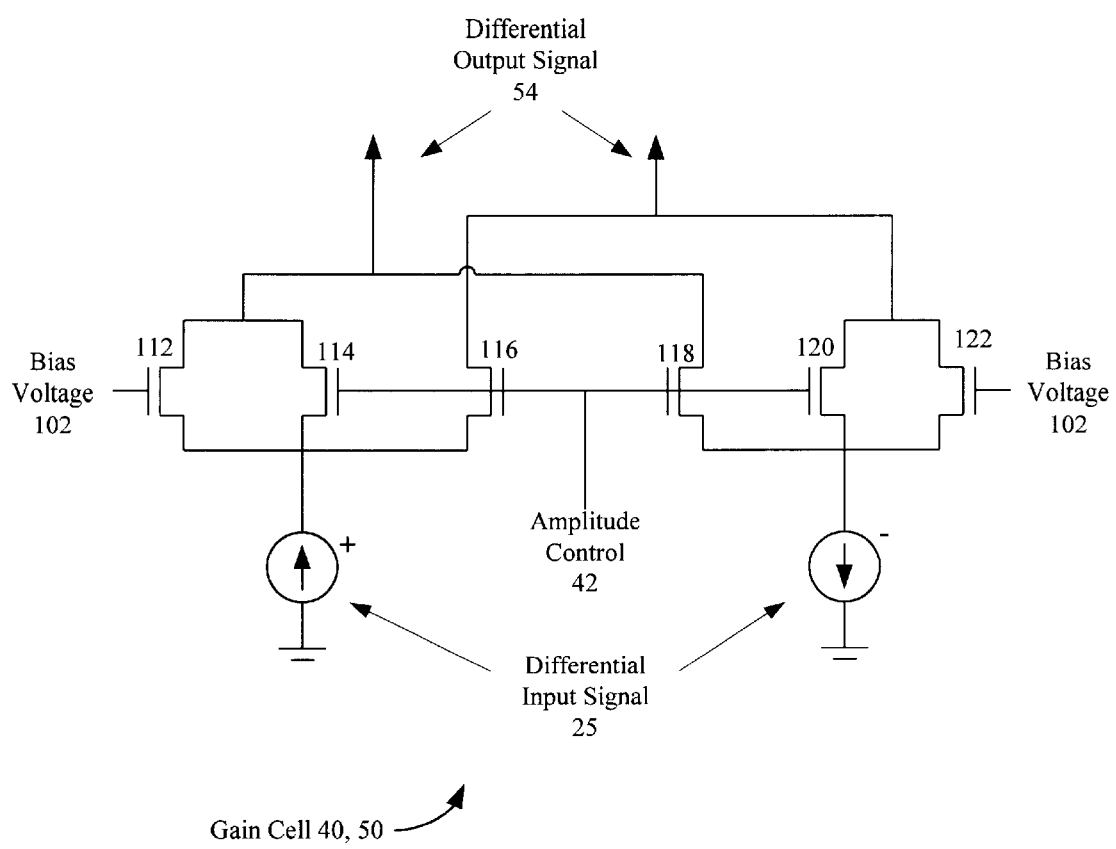
FIG. 2 illustrates a schematic diagram of a gain cell in accordance with the present invention.
Figure 3:
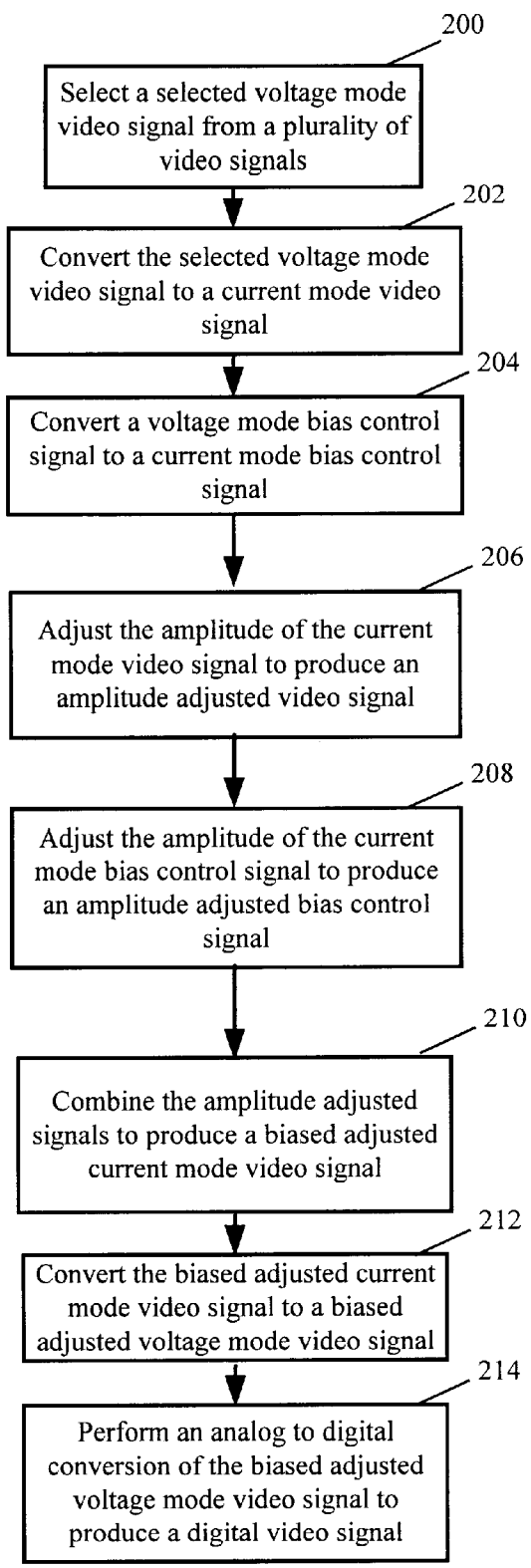
FIG. 3 illustrates a flow diagram of a method for adjusting a video signal in accordance with the present invention.

The invention can be better understood with reference to FIGS. 1–3. FIG. 1 illustrates a video signal adjusting circuit that includes a video signal selector 10, voltage-to-current converters 20 and 30, gain cells 40 and 50, current-to-voltage converter 60, and A/D converter 70. Preferably, the video signal selector 10 is used to select a selected video signal 14 from a plurality of video signals 12. The video signals 12 may originate from a TV tuner, a DVD player, a VCR, or other device that produces a video signal. The selected video signal 14 is determined based on one or more video signal selection signals 16 that are provided to the video signal selector 10.

The voltage-to-current converter 20 receives the selected video signal 14, which is in a voltage mode format and converts the signal to a current mode signal. As one who is skilled in the art will readily appreciate, a voltage-to-current converter may be as simple as a resistor. However, the voltage-to-current converter 20 preferably receives a reference bias signal 22 that is used to bias the conversion circuitry.

A similar voltage-to-current converter 30 preferably receives the same reference bias signal 22 and a bias control signal 32. The bias control signal 32 is preferably generated downstream from the analog-to-digital converter 70 and is used to adjust the DC bias of the signal that is provided to the A/D converter 70. The bias control signal 32, which is preferably a voltage mode signal, is converted to a current mode bias control signal 26 by the voltage-to-current converter 30.

The gain cells 40 and 50 are used to adjust the amplitude of the current mode video signal 24 and the current mode bias control signal 26. The amplitude adjustment is performed based on an amplitude control signal 42, which is preferably generated downstream from the A/D converter 70. A feedback path is created from downstream to the A/D converter 70 to the gain cells 40 and 50 such that the amplitude of the selected video signal 14 is properly adjusted for conversion by the A/D converter 70.

The gain cell 40 performs the amplitude adjustment of the current mode video signal 24. The voltage-to-current conversion allows for linear gain within the gain cell 40. This may be especially important with video inputs having large swings that approach the power supply limitations. For example, the input swing on a video signal may be as much as 2.5 volts, and the integrated circuit may only have a 3-volt supply. In such a situation, if the signal were left in a voltage mode, the desired gain required to adjust the amplitude of the signal may not be possible due to the power supply limitations of the circuit.

In addition to this, current mode signals are typically less susceptible to noise within an integrated circuit. Thus, ringing or other effects on the power supply within the integrated circuit will not corrupt a current mode video signal as much as they would a voltage mode video signal existing on the integrated circuit.

Preferably, the video signal is structured as a differential mode video signal within the integrated circuit. Differential mode signals provide robustness in terms of rejection of common mode fluctuations of the signal within the circuit. The improved common mode rejection of differential amplifiers can help avoid additional degradation of the signal due to noise or other corrupting factors.

FIG. 2 illustrates a preferred embodiment for a differential mode gain cell 40 and 50. The different gain cell includes differential input signals 25, which are illustrated as current sources corresponding to the current mode input signal supplied to a gain cell. The gain cell also receives the amplitude control signal 42, and a bias voltage 102, which is used to bias the circuit. The gain cell includes six transistors 112–122, which are preferably NMOS transistors. Each of the transistors 112–122 includes a gate, a source, and a drain.

The gate of the first transistor 112 and the gate of the sixth transistor 122 are coupled to a bias reference voltage 102, which is used to properly bias the circuit. The input to the circuit, the differential input signal 25, is shown as two current sources. Each of these current sources is a component of the overall differential signal. One source is the positive component of the differential signal, whereas the other current source represents the negative portion of the differential signal. It should be apparent to one of ordinary skill in the art that the polarity of the input current sources may be switched, and the only effect is a corresponding switch in polarity at the differential output signal 54. The sources of the transistors 112–116 are coupled to the positive current source, whereas the sources of the transistors 118–122 are coupled to the negative current source. The differential input signal 25 for the gain cell 40 is the current mode video signal 24, whereas the differential input signal for the gain cell 50 is the current mode bias control signal 26.

The differential output signal 54 is also a differential signal, where one component of the signal is derived from a first node in the circuit, and the other component is derived from a second node. The first node in the circuit, which provides the first portion of the differential output signal 54, is coupled to the drains of the transistors 112, 114, and 118. The second node, which provides the other portion of the differential output signal 54, is coupled to the drains of the transistors 116, 120, and 122. The differential output 54 of the gain cell 40 is the amplitude adjusted current mode video signal, whereas the differential output signal 54 of the gain cell 50 is the amplitude adjusted current mode bias control signal.

The amplitude control signal 42, which is provided as an input to both of the gain cells 40 and 50, is coupled to the gates of the transistors 114–120. The amplitude control signal 42 controls the amplitude adjustment of the signals within the gain cells 40 and 50 such that the amplitude is at the proper level for the A/D converter 70.

Returning to FIG. 1, the outputs of the gain cell 40 and the gain cell 50 are combined at a combining node, or summing node 54. The two current mode signals combine at the node 54 to produce an amplitude adjusted biased current mode video signal 44. The bias portion of the amplitude adjusted biased current mode video signal 44 is provided by the gain cell 50, whereas the adjusted video signal is provided by the gain cell 40.

The current-to-voltage converter 60 receives the amplitude adjusted biased current mode video signal 44 and converts it to an amplitude adjusted biased voltage mode signal. Preferably, this adjusted signal is within the input specifications of the A/D converter 70 such that the A/D converter 70 can generate a digital video signal 74 from the analog signal. The current-to-voltage converter 60 preferably includes a differential amplifier that performs the current-to-voltage conversion.

Preferably, the integrated circuit that includes the circuit illustrated in FIG. 1 also includes a processor that processes the digital video signal 74. Such a processor may introduce various effects into the video signal prior to display, or may perform other processing functions on the video signal prior to output.

FIG. 3 illustrates a flow diagram of a method for adjusting a video circuit prior to A/D conversion. The method begins at step 200 where a selected voltage mode video signal is selected from a plurality of video signals. At step 202, the selected voltage mode video signal is converted to a current mode video signal. As was described with respect to FIG. 1 above, the conversion of the video signal to a current mode allows for more linear gain when the amplitude of the signal is adjusted, and also makes the signal more resistant to noise that may exist on the integrated circuit. Preferably, the signals described in the method of FIG. 3 are differential signals, further reducing the susceptibility to degradation due to noise and other corrupting factors.

At step 204, a voltage mode bias control signal is converted to a current mode bias control signal. The bias control signal is included to adjust the DC bias of the video signal such that it matches the input requirements of the A/D converter. As described earlier, this signal is preferably generated by an entity that monitors the performance of the A/D and detects when adjustment of the biasing of the input signal to the A/D is required.

At step 206, the amplitude of the current mode video signal is adjusted to produce an amplitude adjusted video signal. Similarly, at step 208, the amplitude of the current mode bias control signal is adjusted to produce an amplitude adjusted bias control signal. Preferably, the amplitude adjustment performed at steps 206 and 208 is performed using a gain cell structure as illustrated in FIG. 2. The amplitude adjustment is preferably controlled based on the present state of the signal being provided to the A/D. If the amplitude swing of the current signal at the A/D is too great, circuitry downstream from the A/D will detect this condition. The downstream circuitry will then provide feedback to the amplifiers such that the swing of the signals is attenuated. Similarly, if the amplitude is determined to be too small, feedback will be provided to increase the amplitude to the appropriate level.

At step 210, the amplitude adjusted bias control signal is combined with the amplitude adjusted video signal to produce a bias adjusted current mode video signal. The DC biasing provided by the amplitude adjusted bias control signal places the video signal at the correct level for A/D conversion. The amplitude adjustment performed on the video signal constrains the maximum swing of the video signal to fit within the parameter limitations of the A/D converter. For example, an A/D converter may want a maximum swing of 1 volt, whereas the input video signal has a swing of 2.5 volts. In such a case, the amplitude adjustment performed at step 206 will reduce the amplitude swing of the video signal such that it is within the input limits of the A/D converter.

At step 212, the biased adjusted current mode video signal is converted to a biased adjusted voltage mode video signal. The A/D converter typically desires a voltage mode signal, and therefore, the current mode signal must be converted prior to A/D conversion.

At step 214 an analog-to-digital conversion is performed on the biased adjusted voltage mode video signal to produce a digital video signal. The digital video signal produced at step 214 may then be provided to an on-chip video processing circuit that performs various video processing functions on the signal prior to output.

The method and apparatus provided herein allow for video signals to be adjusted to meet the input requirements of analog-to-digital converters that are typically included in-video processing integrated circuits. Such adjustment of the video signals can include adjusting the amplitude swing of the signal and correcting the DC bias of the signal. By converting the voltage mode input video signal to a current mode prior to adjusting their amplitude and bias, the susceptibility of these signals to noise and non-linear gain in the circuit amplifiers is reduced. By performing the adjustments to the video signals in a differential mode, susceptibility to corruption is further reduced.

It should be understood that the implementation of variations and modifications of the invention and its various aspects will be apparent to those of ordinary skill in the art, and that the invention is not limited to the specific embodiments described. It is therefore contemplated to cover by the present invention any and all modifications, variations, or equivalents that fall within the spirit and scope of the basic underlying principles disclosed and claimed herein.

What is claimed is:

1. A video signal adjusting circuit, comprising:
   a first gain cell, wherein the first gain cell receives an amplitude control signal and a current-mode video signal, wherein the first gain cell adjusts the amplitude of the current-mode video signal based on the amplitude control signal to produce an amplitude adjusted current-mode video signal;
   a second gain cell, wherein the second gain cell receives the amplitude control signal and a current-mode bias control signal, wherein the second gain cell adjusts the amplitude of the current-mode bias control signal based on the amplitude control signal to produce an amplitude adjusted current-mode bias control signal; and
   a summing node operably coupled to the first and second gain cells, wherein the summing node combines the amplitude adjusted current-mode video signal and the amplitude adjusted current mode bias control signal to produce an amplitude adjusted biased current-mode video signal.

2. The video signal adjusting circuit of claim 1, wherein the current-mode video signal and the amplitude adjusted current-mode video signal are differential signals having a first component and a second component, wherein the first gain cell further comprises:
   a first transistor having a gate, a drain, and a source, wherein the gate of the first transistor is operably coupled to receive a bias voltage, wherein the source of the first transistor is operably coupled to the first component of the current-mode video signal, wherein the drain of the first transistor is operably coupled to the first component of the amplitude adjusted current-mode video signal;
   a second transistor having a gate, a drain, and a source, wherein the gate of the second transistor is operably coupled to receive the amplitude control signal, wherein the source of the second transistor is operably coupled to the first component of the current-mode video signal, wherein the drain of the second transistor is operably coupled to the first component of the amplitude adjusted current-mode video signal;
   a third transistor having a gate, a drain, and a source, wherein the gate of the third transistor is operably coupled to receive the amplitude control signal, wherein the source of the third transistor is operably coupled to the first component of the current-mode video signal, wherein the drain of the third transistor is operably coupled to the second component of the amplitude adjusted current-mode video signal;
   a fourth transistor having a gate, a drain, and a source, wherein the gate of the fourth transistor is operably coupled to receive the amplitude control signal, wherein the source of the fourth transistor is operably coupled to the second component of the current-mode video signal, wherein the drain of the fourth transistor is operably coupled to the first component of the amplitude adjusted current-mode video signal;
   a fifth transistor having a gate, a drain, and a source, wherein the gate of the fifth transistor is operably coupled to receive the amplitude control signal, wherein the source of the fifth transistor is operably coupled to the second component of the current-mode video signal, wherein the drain of the fifth transistor is operably coupled to the second component of the amplitude adjusted current-mode video signal; and
   a sixth transistor having a gate, a drain, and a source, wherein the gate of the sixth transistor is operably coupled to receive the bias voltage, wherein the source of the sixth transistor is operably coupled to the second component of the current-mode video signal, wherein the drain of the sixth transistor is operably coupled to the second component of the amplitude adjusted current-mode video signal.

3. The bias control signal adjusting circuit of claim 2, wherein the current-mode bias control signal and the amplitude adjusted current-mode bias control signal are differential signals having a first component and a second component, wherein the second gain cell further comprises:
   a first transistor having a gate, a drain, and a source, wherein the gate of the first transistor is operably coupled to receive the bias voltage, wherein the source of the first transistor is operably coupled to the first component of the current-mode bias control signal, wherein the drain of the first transistor is operably coupled to the first component of the amplitude adjusted current-mode bias control signal;
   a second transistor having a gate, a drain, and a source, wherein the gate of the second transistor is operably coupled to receive the amplitude control signal, wherein the source of the second transistor is operably coupled to the first component of the current mode bias control signal, wherein the drain of the second transistor is operably coupled to the first component of the amplitude adjusted current-mode bias control signal;

a third transistor having a gate, a drain, and a source, wherein the gate of the third transistor is operably coupled to receive the amplitude control signal, wherein the source of the third transistor is operably coupled to the first component of the current-mode bias control signal, wherein the drain of the third transistor is operably coupled to the second component of the amplitude adjusted current-mode bias control signal;

a fourth transistor having a gate, a drain, and a source, wherein the gate of the fourth transistor is operably coupled to receive the amplitude control signal, wherein the source of the fourth transistor is operably coupled to the second component of the current-mode bias control signal, wherein the drain of the fourth transistor is operably coupled to the first component of the amplitude adjusted current-mode bias control signal;

a fifth transistor having a gate, a drain, and a source, wherein the gate of the fifth transistor is operably coupled to receive the amplitude control signal, wherein the source of the fifth transistor is operably coupled to the second component of the current-mode bias control signal, wherein the drain of the fifth transistor is operably coupled to the second component of the amplitude adjusted current-mode bias control signal; and a sixth transistor having a gate, a drain, and a source, wherein the gate of the sixth transistor is operably coupled to receive the bias voltage, wherein the source of the sixth transistor is operably coupled to the second component of the current-mode bias control signal, wherein the drain of the sixth transistor is operably coupled to the second component of the amplitude adjusted current-mode bias control signal.

4. The video signal adjusting circuit of claim 3 further comprises:

a first voltage to current converter operably coupled to the first gain cell, wherein the first voltage to current converter receives a selected analog voltage-mode video signal, wherein the first voltage to current converter converts the selected analog voltage-mode video signal to the current-mode video signal; and a second voltage to current converter operably coupled to the second gain cell, wherein the second voltage to current converter receives a voltage-mode bias control signal, wherein the second voltage to current converter converts the voltage-mode bias control signal to the current-mode bias control signal.

5. The video signal adjusting circuit of claim 4 further comprises a current to voltage converter operably coupled to the summing node, wherein the current to voltage converter converts the amplitude adjusted biased current-mode video signal to an amplitude adjusted biased voltage-mode video signal.

6. The video signal adjusting circuit of claim 5, wherein the current to voltage converter further comprises a differential amplifier.

7. The video signal adjusting circuit of claim 5 further comprises an analog to digital converter operably coupled to the current to voltage converter, wherein the analog to digital converter converts the amplitude adjusted biased voltage-mode video signal to a digital video signal.

8. The video signal adjusting circuit of claim 7 further comprises a video signal selector operably coupled to the first voltage to current converter, wherein the video signal selector receives a plurality of video signals and selects the selected analog voltage-mode video signal from the plurality of video signals.

9. The video signal adjusting circuit of claim 8, wherein the video signal adjusting circuit is a portion of a video graphics integrated circuit.

10. The video signal adjusting circuit of claim 8, wherein the video graphics integrated circuit further comprises a processor that processes the digital video signal.

11. A gain control circuit comprising:

a first voltage to current converter, wherein the first voltage to current converter receives a selected analog voltage-mode video signal and a reference bias signal, wherein the first voltage to current converter converts the selected analog voltage-mode video signal to a current-mode video signal;

a second voltage to current converter, wherein the second voltage to current converter receives a voltage-mode bias control signal and the reference bias signal, wherein the second voltage to current converter converts the voltage-mode bias control signal to a current-mode bias control signal;

a first gain cell operably coupled to the first voltage to current converter, wherein the first gain cell has a differential input, an amplitude control input, and a differential output, wherein the differential input of the first gain cell is coupled to the current-mode video signal, wherein the amplitude control input of the first gain cell receives an amplitude control signal;

a second gain cell operably coupled to the second voltage to current converter, wherein the second gain cell has a differential input, an amplitude control input, and a differential output, wherein the differential input of the second gain cell is coupled to the current-mode bias control signal, wherein the amplitude control input of the second gain cell receives the amplitude control signal;

a combining node operably coupled to the first and second gain cells, wherein the combining node combines the differential outputs of the first and second gain cells to produce an adjusted video signal;

a current to voltage converter operably coupled to the combining node, wherein the current to voltage converter converts the adjusted video signal to a voltage-mode adjusted video signal; and an analog to digital converter operably coupled to the current to voltage converter, wherein the analog to digital converter converts the voltage-mode adjusted video signal to a digital video signal.

12. The gain control circuit of claim 11, wherein each of the first and second gain cells further comprises:

a first transistor having a gate, a drain, and a source, wherein the gate of the first transistor is operably coupled to a bias voltage, wherein the source of the first transistor is operably coupled to a first portion of the differential input, wherein the drain of the first transistor is operably coupled to a first portion of the differential output;

a second transistor having a gate, a drain, and a source, wherein the gate of the second transistor is operably coupled to the amplitude control input, wherein the source of the second transistor is operably coupled to the first portion of the differential input, wherein the drain of the second transistor is operably coupled to the first portion of the differential output;

a third transistor having a gate, a drain, and a source, wherein the gate of the third transistor is operably coupled to the amplitude control input, wherein the source of the third transistor is operably coupled to the first portion of the differential input, wherein the drain of the third transistor is operably coupled to a second portion of the differential output;

a fourth transistor having a gate, a drain, and a source, wherein the gate of the fourth transistor is operably coupled to the amplitude control input, wherein the source of the fourth transistor is operably coupled to a second portion of the differential input, wherein the drain of the fourth transistor is operably coupled to the first portion of the differential output;

a fifth transistor having a gate, a drain, and a source, wherein the gate of the fifth transistor is operably coupled to the amplitude control input, wherein the source of the fifth transistor is operably coupled to the second portion of the differential input, wherein the drain of the fifth transistor is operably coupled to the second component of the differential output; and a sixth transistor having a gate, a drain, and a source, wherein the gate of the sixth transistor is operably coupled to the bias voltage, wherein the source of the sixth transistor is operably coupled to the second portion of the differential input, wherein the drain of the sixth transistor is operably coupled to the second component of the differential output.

13. The gain control circuit of claim 12 further comprises a video signal selector operably coupled to the first voltage to current converter, wherein the video signal selector receives a plurality of video signals and selects the selected analog voltage-mode video signal from the plurality of video signals.

14. The gain control circuit of claim 13, wherein the current to voltage converter further comprises a differential amplifier.

15. The gain control circuit of claim 14, wherein the gain control circuit is included in a video graphics integrated circuit.

16. A method for adjusting a video signal, comprising:
converting a received voltage mode video signal to a current mode video signal;
converting a voltage mode bias control signal to a current mode bias control signal;
adjusting the amplitude of the current mode video signal to produce an amplitude adjusted video signal;
adjusting the amplitude of the current mode bias control signal to produce an amplitude adjusted bias control signal; and
combining the amplitude adjusted video signal and the amplitude adjusted bias control signal to produce a biased adjusted current mode video signal.

17. The method of claim 16 further comprises converting the biased adjusted current mode video signal to a biased adjusted voltage mode video signal.

18. The method of claim 17 further comprises performing an analog to digital conversion of the biased adjusted voltage mode video signal to produce a digital video signal.

19. The method of claim 18 further comprises selecting the voltage mode video signal from a plurality of video signals.

* * * * *